(12) United States Patent
Ricker et al.

(10) Patent No.: US 9,299,038 B2
(45) Date of Patent: Mar. 29, 2016

(54) METHOD AND SYSTEM FOR REMEDIATION SYSTEM BENEFIT ANALYSIS

(75) Inventors: Joe A. Ricker, Olive Branch, MS (US); Timothy O. Goist, Marietta, GA (US)

(73) Assignee: Earth Consulting Group, Inc., Marietta, GA (US)

(*) Notice: Subject to any disclaimer, the term of this patent is extended or adjusted under 35 U.S.C. 154(b) by 935 days.

(21) Appl. No.: 13/529,462

(22) Filed: Jun. 21, 2012

(65) Prior Publication Data

US 2013/0006538 A1  Jan. 3, 2013

Related U.S. Application Data

(60) Provisional application No. 61/502,043, filed on Jun. 28, 2011.

(51) Int. Cl.
*G01V 3/00* (2006.01)
*G06Q 10/04* (2012.01)
*G01V 7/00* (2006.01)

(52) U.S. Cl.
CPC ...................................... *G06Q 10/04* (2013.01)

(58) Field of Classification Search
CPC ................................. G06F 17/13; G06Q 10/04
See application file for complete search history.

(56) References Cited

U.S. PATENT DOCUMENTS

2003/0216949 A1* 11/2003 Kram ................... G06Q 10/02
                                                                  705/5

OTHER PUBLICATIONS

Ricker, Joseph A., "A Practical Method to Evaluate Ground Water Contaminant Plume Stability", Ground Water Monitoring and Remediation 28, No. 4, Fall 2008 (10 Pages).*
Ricker, Joseph A., "A Practical Method to Evaluate Ground Water Contaminant Plume Stability," Ground Water Monitoring and Remediation 28, No. 4, Fall 2008 (10 pages).

* cited by examiner

*Primary Examiner* — Phuong Huynh
(74) *Attorney, Agent, or Firm* — Meunier Carlin & Curfman LLC

(57) ABSTRACT

A method for evaluating the benefit of a remediation system, the method comprising calculating plume stability characteristics, determining a mass indicator trend line; determining a contaminant removed trend line, graphically displaying the mass indicator trend line and the contaminant removed trend line, and determining a remediation system benefit trend based on a graphical relationship of the mass indicator trend line and the contaminant removed trend line shown on the graphical display. Also, a method for analyzing a remediation system, the method comprising determining a remediation system benefit trend, determining a relative cost trend, determining a cost/benefit indicator, and categorizing the remediation system according to the remediation system benefit trend, the relative cost trend, and the cost/benefit indicator.

13 Claims, 9 Drawing Sheets

| Remediation System Benefit Trend | Relative Cost Trend | Cost/Benefit Indicator |
|---|---|---|
| Ineffective | Increasing | High CBI |
| Effective | Stagnant | |
| Beneficial | | Low CBI |
| Overwhelmed | Decreasing | |

METHOD AND SYSTEM FOR REMEDIATION SYSTEM BENEFIT ANALYSIS

CROSS-REFERENCE TO RELATED APPLICATIONS

This application claims priority under 35 U.S.C. §119(e) to U.S. Provisional Application Ser. No. 61/502,043 filed on Jun. 28, 2011. U.S. Provisional Application Ser. No. 61/502,043 is hereby incorporated by reference in its entirety.

BACKGROUND

1. Field of the Invention

Embodiments disclosed herein relate to methods and systems for evaluating the benefit of a remediation system. More specifically, embodiments disclosed herein relate generally to methods and systems for evaluating the benefit of a remediation system through graphical representation of a condition of a remediation system. More specifically still, embodiments disclosed herein relate generally to methods and systems for evaluating the benefit of a remediation system by determining whether a remediation system is operating effectively, ineffectively, in an overwhelmed state, or in a beneficial state.

2. Background Art

Evaluating the relative stability of a groundwater contaminant plume is generating increasing attention as many state regulatory agencies, the Environmental Protection Agency ("EPA"), and private stakeholders are realizing the applicability of plume stability as part of the environmental evaluation and/or remedial planning process of a site. Specifically, a plume stability evaluation may allow the stakeholder to assess whether a contaminant plume is stable, decreasing or increasing in size. Assessing the stability of a plume may further allow the stakeholder to evaluate whether additional remedial action is necessary or whether risk-based closure of a site may be applicable or whether MNA is occurring at a site. There are many other ancillary applications of plume stability evaluations as related to groundwater contamination.

There are a number of environmental practitioners that are and have evaluated the efficiency of groundwater remediation systems. These evaluations are typically related to the cost to maintain a system, amount of mass removed as a function of cost, amount of mass removed as a function of clean-up goals, etc. In many instances, models are used to assess the efficiency of groundwater remediation systems. Model output is heavily dependent on the proper use and selection of a potentially wide range of variable input data. Additionally, models may be manipulated and interpreted differently by various modelers. Thus, replication of modeled data becomes overly complicated as the amount of variability of input data increases.

Accordingly, there exists a continuing need for methods and systems that allow a stakeholder to evaluate the benefit of a groundwater remediation system.

SUMMARY

In general, in one aspect, embodiments of the invention relate to a method for evaluating the benefit of a remediation system, the method comprising calculating plume stability characteristics for a plume, determining a mass indicator trend line using the plume stability characteristics, determining a contaminant removed trend line based on information about contaminant removal from the plume by the remediation system, graphically displaying the mass indicator trend line and the contaminant removed trend line on a graphical display, and determining a remediation system benefit trend for the remediation system based a graphical relationship of the mass indicator trend line and the contaminant removed trend line shown on the graphical display.

In general, in one aspect, embodiments to a method for analyzing a remediation system, the method comprising determining a remediation system benefit trend; determining a relative cost trend; determining a cost/benefit indicator; and categorizing the remediation system according to the remediation system benefit trend, the relative cost trend, and the cost/benefit indicator.

Other aspects of the invention will be apparent from the following description and the appended claims.

DETAILED DESCRIPTION

In one aspect, embodiments disclosed herein relate to methods and systems for evaluating the benefit of a remediation system. More specifically, embodiments disclosed herein relate generally to methods and systems for evaluating the benefit of a remediation system through graphical representation of a condition of a remediation system. More specifically still, embodiments disclosed herein relate generally to methods and systems for evaluating the benefit of a remediation system by determining whether a remediation system is operating effectively, ineffectively, in an overwhelmed state, or in a beneficial state.

Typically, evaluations of remediation systems are performed to determine and evaluate the cost to maintain a system and/or to determine the amount of mass removed as a function of cost. Embodiments of the present disclosure provide methods to evaluate the benefit of a remediation system as it relates to plume stability and various determined conditions.

Generally, as used herein, a plume refers to an area of air, water, or soil containing pollutants released from a particular source. A plume may also receive or otherwise be contaminated by multiple sources. Plume stability generally refers to the condition of the plume, i.e., whether the plume is growing, shrinking, or stable.

In order to perform a remediation system benefit analysis, a remediation system benefit trend is determined, a relative cost trend is determined, and a cost/benefit indicator is determined. Once these three variables have been determined, the operation of a remediation system may be categorized into one of 24 scenarios representative of the benefit the remediation system is having on a particular plume. The determination of the remediation system benefit trend, the relative cost trend, and the cost/benefit indicator is discussed in detail below.

Remediation System Benefit Trend

The first step in analyzing a remediation system is determining a remediation system benefit trend. Based on a provided set of graphical outputs, the relative benefit of a particular remediation system may be determined by evaluating the mass of contaminant that the system removes correlated to the stability of a plume. In this step, the mass indicator linear regression trend line from the Ricker Method is compared to the mass of contaminant removed and both trend lines are normalized to equal mass units. The resulting trend lines are then anchored to a common point and the resulting graphical representation may be used to determine a remediation system benefit trend. The different conditions that may occur are an effective system, an ineffective system, an overwhelmed system, and a beneficial system. The following section provides a more detailed explanation of each possible condition.

Figure 1:
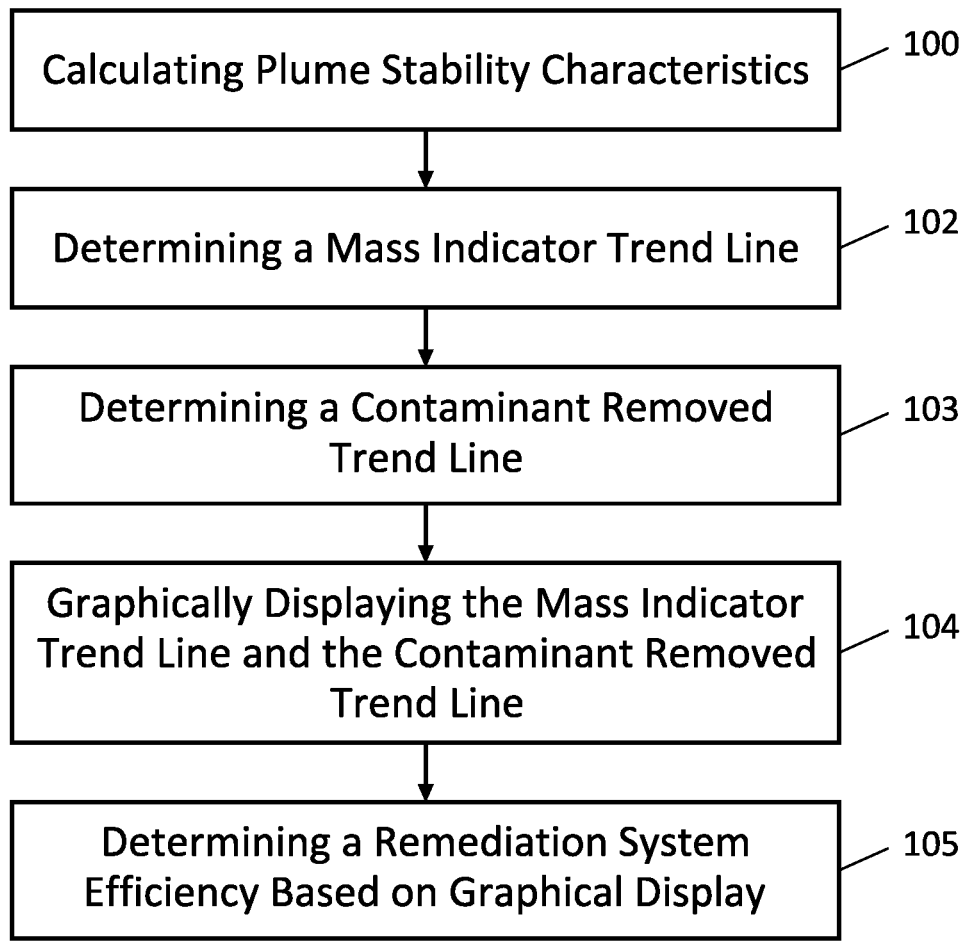
FIG. 1 is a flow chart representative of a method for evaluating the efficiency of a remediation system according to embodiments of the present disclosure.

Referring to FIG. 1, a flow chart of a method for evaluating the benefit of a remediation system according to embodiments of the present disclosure is shown. According to the method, initially plume stability characteristics are calculated 100. The plume stability characteristics may include an area, average concentration, mass, center of mass, and/or combinations thereof. One method of calculating plume stability characteristics may be achieved through the Ricker Plume Stability Method, described in *A Practical Method to Evaluate Ground Water Contaminant Plume Stability*, Ground Water Monitoring & Remediation, Volume 28, Issue 4, pages 85-94, Fall 2008, hereby incorporated by reference herein. The Ricker Plume Stability Method provides a graphical representation to allow for the evaluation of plume characteristics, as well as provides a statistical trend to allow for plume stability to be assessed. Through the assessment of plume stability, one of ordinary skill in the art may determine, for example, whether a plume is growing, shrinking, moving, stable, or the like. In order to calculate the plume stability characteristics, historical data from the plume, as well as newly acquired data may be required. Thus, in certain embodiments, in order to calculate plume stability, data about the plume is provided.

After calculating the plume stability characteristics 100, a mass indicator trend line is determined 101. The mass indicator trend line may be, for example, the mass indicator linear regression trend line from the Ricker Plume Stability Method. The mass indicator trend line shows the relative stability of the plume, and provides an indicia as to whether the plume is stable, growing, or shrinking.

In addition to determining the mass indicator trend line 102, a contaminant removed trend line is determined 103. The contaminant removed trend line 103 is a linear regression trend line that represents the mass of contaminant removed by the remediation system that is being evaluated. In one embodiment of the invention, the contaminant removed trend line is calculated by obtaining a reading of contaminant mass from the remediation system influent at specific points in time, and plotting the contaminant mass in influent overtime in order to develop a trend line. In order to allow the contaminant trend line to be compared to the mass indicator trend line 102, the trend lines are normalized to an equal mass unit, for example, grams, kilograms, pounds, etc.

After the mass indicator trend line and the contaminant removed trend lines are determined, the two trend lines are graphed relative to one another and displayed anchored at a common point 104. After the mass indicator trend line and the contaminant removed trend lines are graphed 104, a remediation system benefit may be determined 105 based on the graphical display.

Accordingly to embodiments of the present disclosure, remediation system benefit may be evaluated as a condition in which the remediation system is operating. In this embodiment, a remediation system may be operating in one of four different conditions, in an effective condition, an ineffective condition, an overwhelmed condition, or a beneficial condition. Based on the type of condition in which the remediation system is operating, an operator may take various steps to adjust the remediation system to enhance the operation. Additionally, a cost/benefit analysis may be performed to determine whether to continue operating the remediation system or otherwise stop the remediation operation. Each of the operating conditions that may be determined based on the methods disclosed herein are discussed in detail below.

Figure 2:
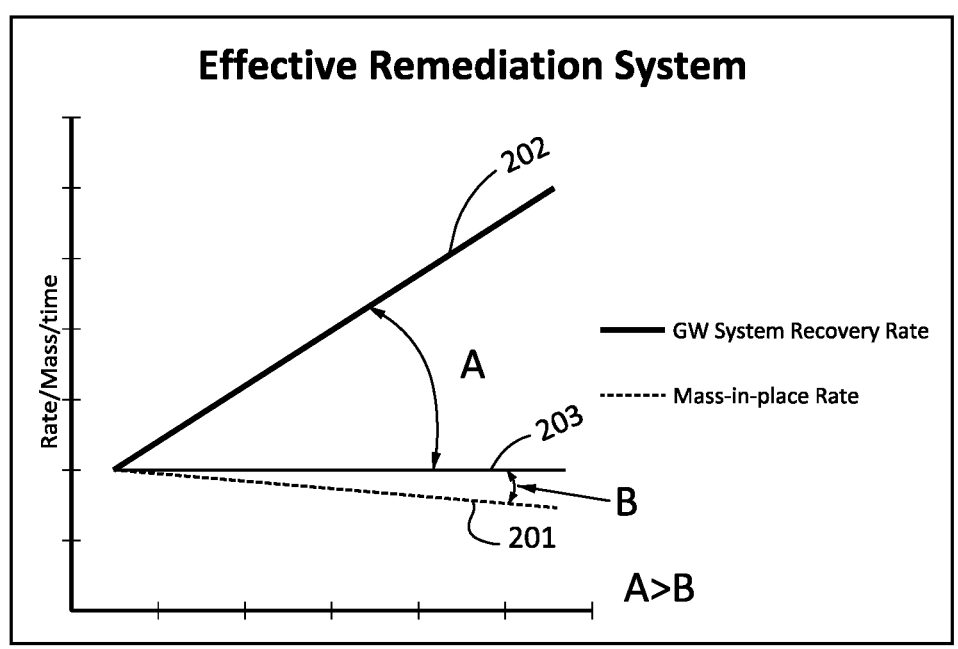
FIG. 2 is a graphical display of an effective system with a contributing source according to embodiments of the present disclosure.

Referring to FIG. 2, a graphical display 200 of a remediation system operating in an effective condition according to embodiments of the present disclosure is shown. In this embodiment, a mass indicator trend line 201 is graphically displayed relative to a contaminant removed trend line 202, and anchored at a common location 203.

As illustrated, contaminant removed trend line 202 is increasing at a greater rate than the mass indicator trend line 201 is decreasing. Thus, the amount of mass removed is greater than the mass reduction in-situ. One of ordinary skill in the art will appreciate that such a condition indicates that an additional source may be contributing to the contamination, thereby adding additional contaminant mass to the plume. Said another way, when A>B, the remediation system is operating effectively, but an additional source is adding contaminant mass to the plume.

In this condition, the remediation system is effective in keeping the plume mass indicator in check, and as such, turning off or otherwise removing the remediation system may result in the plume losing stability and/or growing because the mass added by the contributing source exceeds the mass removed by the in-situ process. In such a situation, those of ordinary skill in the art will appreciate that modifications to the system may include adjusting the remediation system to increase the processing of contaminants; however, the remediation system should not be turned off or removed.

Figure 3:
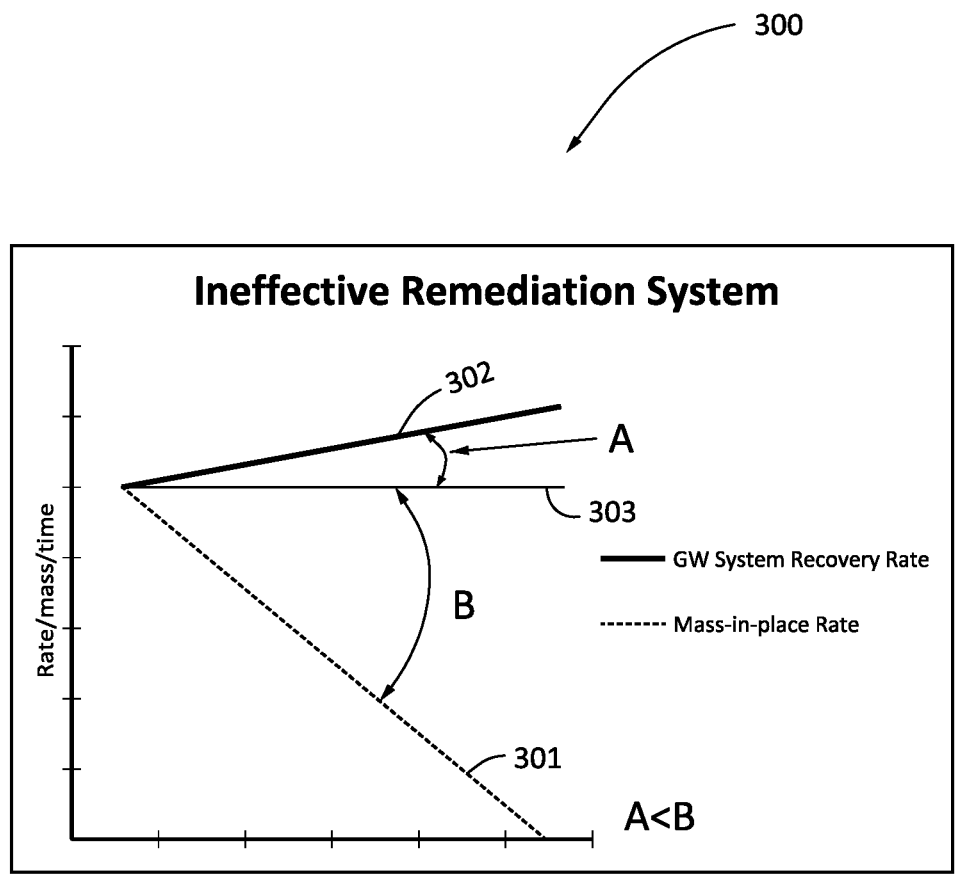
FIG. 3 is a graphical display of an ineffective system according to embodiments of the present disclosure.

Referring to FIG. 3, a graphical display 300 of a remediation system operating in an ineffective condition according to embodiments of the present disclosure is shown. In this embodiment, a mass indicator trend line 301 is graphically displayed relative to a contaminant removed trend line 302, and anchored at a common location 303.

In the ineffective condition, the mass indicator trend line 301 is reducing despite the presence of a remediation system, resulting in the mass indicator trend line 301 decreasing at a rate greater than the contaminant removed trend line 302. Thus, the mass removed by the remediation system partially contributes to the reduction of the mass indicator, but is not responsible for keeping the plume stable. In such a condition, the remediation system may be turned off or removed without upsetting plume stability. Said another way, when A<B the mass removed by the system is not responsible for plume stability. This condition may further indicate that the cost to operate the remediation system is not beneficial.

Those of ordinary skill in the art will appreciate that an ineffective system may be adjusted to either increase efficiency, i.e., modifying the remediation system, or, in certain embodiments, removing the remediation system, as plume stability is not likely to be negatively impacted by removal of the system.

Figure 4:
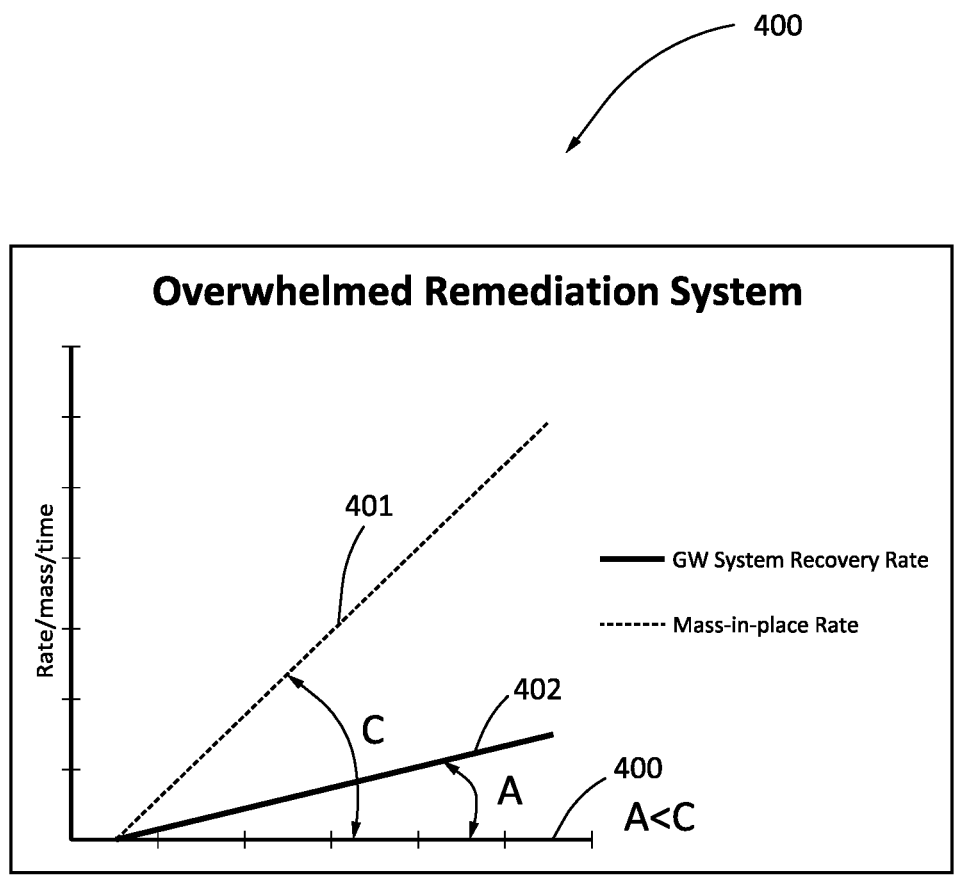
FIG. 4 is a graphical display of an overwhelmed system according to embodiments of the present disclosure.

Referring to FIG. 4, a graphical display 400 of a remediation system operating in an overwhelmed condition according to embodiments of the present disclosure is shown. In this embodiment, a mass indicator trend line 401 is graphically displayed relative to a contaminant removed trend line 402, and anchored at a common location 403.

In the overwhelmed condition, the mass indicator trend line 401 is increasing and thus shows a plume that is not stable and increasing in mass. Because the mass indicator trend line 401 is positive, those of ordinary skill in the art will appreciate that the plume is not stable. Additionally, such a condition indicates that the remediation system in place is not capable of removing enough contaminant mass to create a stable plume. In certain situations, such a condition may be the result of a remediation system that is not optimized for the plume, or otherwise indicate that a plume condition has changed such that the remediation system is no longer effective. In the condition when A<C the remediation system is overwhelmed or undersized and the mass of pollutant being added to the plume exceeds the mass extracted by the treatment system.

When an ineffective condition is determined, the remediation system may be adjusted to further increase the processing of contaminants. Removal of the remediation system is generally not recommend, as the remediation system may be providing at least some benefit by keeping the plume from expanding at an even greater pace.

Figure 5:
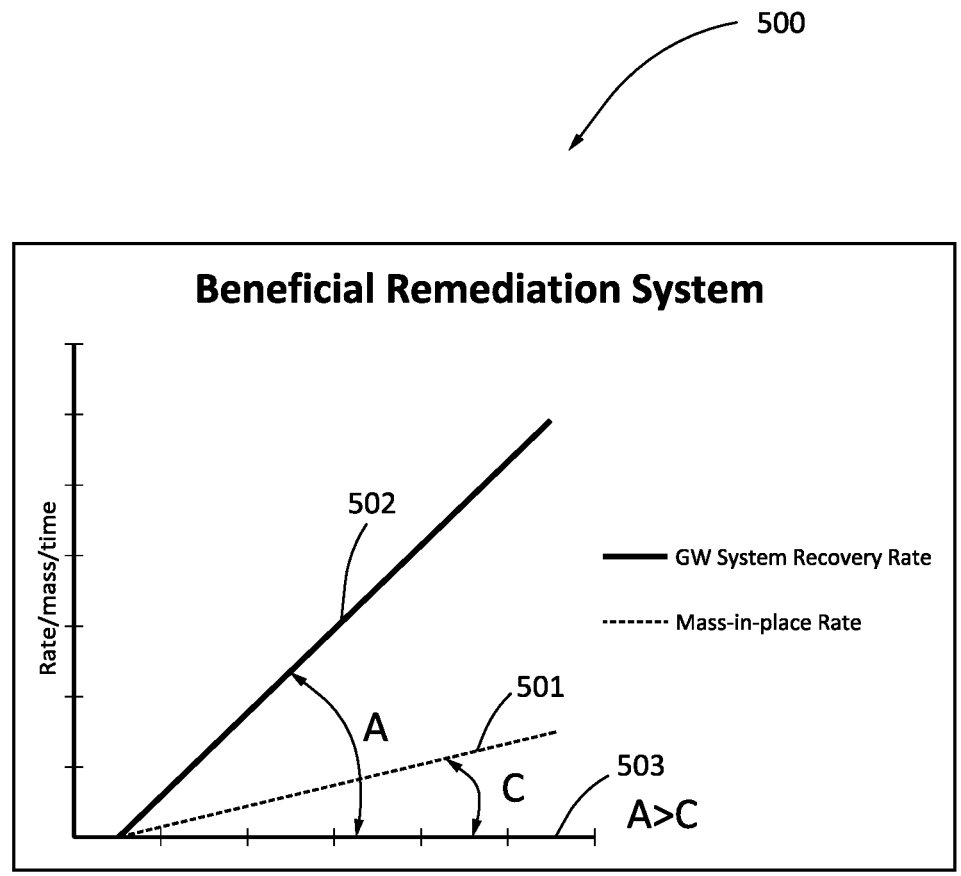
FIG. 5 is a graphical display of a beneficial system according to embodiments of the present disclosure.

Referring to FIG. 5, a graphical display 500 of a remediation system operating in an overwhelmed condition according to embodiments of the present disclosure is shown. In this embodiment, a mass indicator trend line 501 is graphically displayed relative to a contaminant removed trend line 502, and anchored at a common location 503.

In the beneficial condition, the mass indicator trend line 501 is increasing and thus shows a plume that is not stable. However, the graph shows that the mass removed by the remediation system 502 exceeds the mass indicator trend line 501. Such a condition indicates that the remediation system is providing a benefit by removing mass at a rate faster than the source is contributing to the plume. Thus, the remediation system reduces the potential expansion of the plume and, given time or adjusted to increase its efficiency, the remediation system may result in stabilizing the plume. Because the remediation system is providing positive benefits, it is likely that turning off or removing the remediation system would result in a plume that expands at a greater rate. In the beneficial condition, A>C, indicating that the remediation system is removing mass of contaminant at a rate greater than the source is contributing to the plume.

Relative Cost Trend

After the remediation system benefit trend is determined, the relative cost trend may be determined. The relative cost trend describes the cost of the remediation system in relation to the amount of contaminant mass being removed. Relative cost trend is determined by plotting a linear regression trend line of a monetary unit spent per mass unit of contaminant removed over time. In other embodiments, alternative graphical representations may be used in the place of linear regression, such as actual data plots and scatter plots. Three possible relative cost trends can be determined, increasing cost, decreasing cost, or stable cost.

Figure 6:
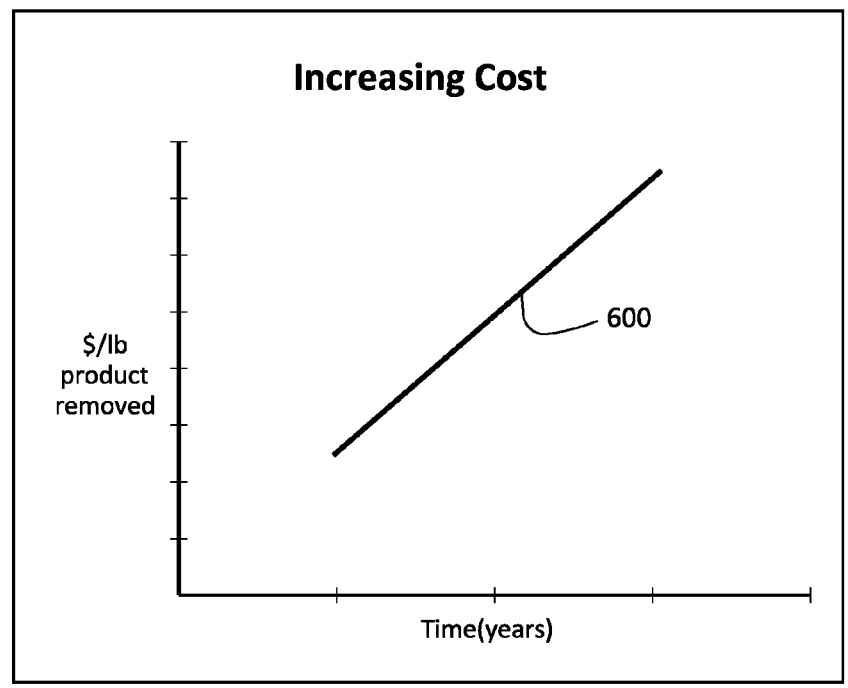
FIG. 6 is a graphical display of an increasing cost trend according to embodiments of the present disclosure.

Referring briefly to FIG. 6, a graphical representation of an increasing relative cost trend is shown. In such a condition, the cost of operating a particular remediation system is increasing over time, as indicated by trend line 600. Those of ordinary skill in the art will appreciate that the slope of trend line 600 may indicate how quickly the operating costs are increasing and may provide additional information with respect to how much longer the operation may remain viable.

Figure 7:
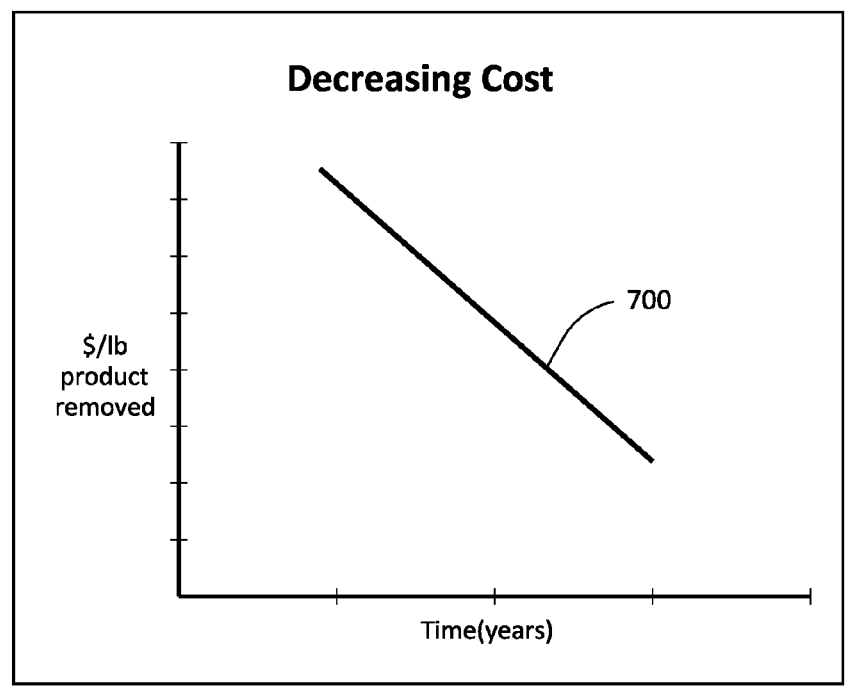
FIG. 7 is a graphical display of a decreasing cost trend according to embodiments of the present disclosure.

Referring briefly to FIG. 7, a graphical representation of a decreasing relative cost trend is shown. In such a condition, the cost of operating a particular remediation system is decreasing over time, as indicated by trend line 700. Those of ordinary skill in the art will appreciate that the slope of trend line 700 may indicate a change in a condition of the remediation system such that it has become more cost efficient.

Figure 8:
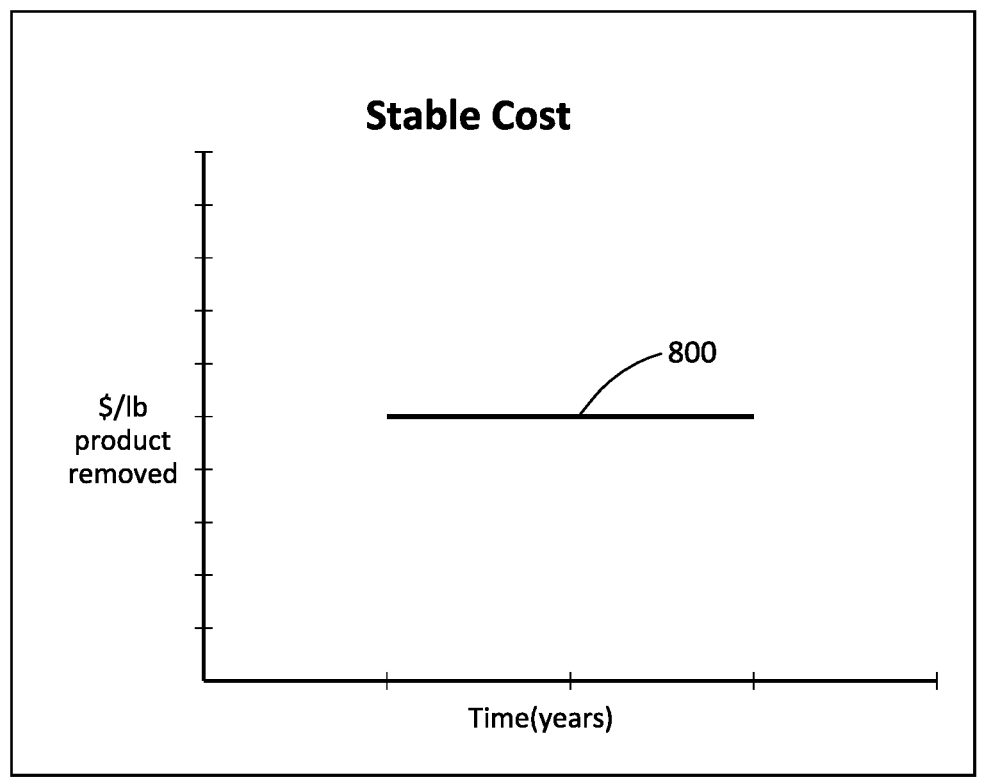
FIG. 8 is a graphical display of a stagnant cost trend according to embodiments of the present disclosure.

Referring briefly to FIG. 8, a graphical representation of a stable relative cost trend is shown. In such a condition the cost of operating a particular remediation system is relatively stable, as indicated by trend line 800.

Those of ordinary skill in the art will appreciate that the cost trend may consist of more than one trend per a particular period of time. For example, over a ten year period, the remediation system may go through several periods in which the relative cost trend is increasing, decreasing, or relatively stable. For example, in certain instances, the remediation system may initially be decreasing or stable, but, as the systems ages, the cost trend may increase as a result of less efficiency, etc.

Cost/Benefit Indicator

After a relative cost trend is determined, a cost/benefit analysis may be evaluated. In order to determine the cost/benefit of a remediation system, the cost of the system in dollars per mass unit contaminant removed may be determined for a particular time interval. The output is then tied to a common commodity spot price (e.g., troy ounce of gold) and then normalized by calculating the arctangent of the above identified quotient. The normalized result produces a value between 0 and 90, with 0 indicating that the system is excessively inexpensive relative to mass recovered and 90 indicating that the system is excessively expensive relative to mass recovered. The result is graphically represented on a pie chart when the calculated cost/benefit indicator is depicted in angular degrees from a horizontal datum.

Figures 9, 10:
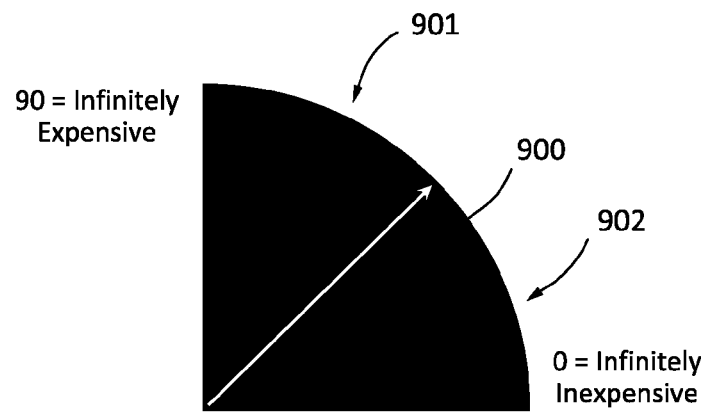
FIG. 9 is a graphical display of a cost/benefit indicator according to embodiments of the present disclosure.
FIG. 10 is a graphical display of a relative system benefit analysis according to embodiments of the present disclosure.

Referring to FIG. 9, a graphical representation of a cost/benefit indicator according to embodiments of the present disclosure is shown. As illustrated, the cost/benefit indicator 900 has a value of 45. The cost/benefit indicator may provide those of ordinary skill in the art knowledge as to whether a system is relatively expensive, which is represented as a high cost/benefit indicator 901 between 90 and 45 or a relative inexpensive, which is represented as a low cost/benefit indicator 902 between 45 and 0. The value of the cost/benefit indicator may then be used in analyzing a particular remediation system.

Relative System Benefit Analysis

Referring to FIG. 10, a graphical representation of a relative system benefit analysis according to embodiments of the present disclosure is shown. After the remediation system benefit trend 1000, the relative cost trend 1001, and the cost/benefit indicator 1002 are determined, the three graphical outputs may be combined to categorize a particular remediation system. The remediation system may be categorized into one of 24 possible scenarios. Examples of each such possible scenario are discussed in detail in the following examples.

Example 1

Ineffective Remediation System Benefit Trend;
Increasing Relative Cost Trend; High Cost/Benefit
Indicator In this scenario, it may be possible to turn off the remediation system without upsetting plume stability. The unit cost per pound of contaminant removed is increasing. This could be caused by increasing operating and maintenance ("O&M") cost or a cumulative mass recovery rate that is approaching asymptotic conditions. In addition, the system is excessively expensive relative to mass recovered.

Example 2

Ineffective Remediation System Benefit Trend;
Increasing Relative Cost Trend; Low Cost/Benefit
Indicator In this scenario, it may be possible to turn off the remediation system without upsetting plume stability. The unit cost per pound of contaminant removed is increasing. This could be caused by increasing O&M cost or a cumulative mass recovery rate that is approaching asymptotic conditions. In addition, the system is inexpensive relative to mass recovered.

Example 3

Ineffective Remediation System Benefit Trend;
Stagnant Relative Cost Trend; High Cost/Benefit
Indicator In this scenario, it may be possible to turn off the remediation system without upsetting plume stability. The unit cost per pound of contaminant removed is unchanging. This could be caused by O&M costs remaining relatively constant or a cumulative mass recovery rate that is relatively constant. In addition, the system is excessively expensive relative to mass recovered.

Example 4

Ineffective Remediation System Benefit Trend;
Stagnant Relative Cost Trend; Low Cost/Benefit
Indicator In this scenario, it may be possible to turn off the remediation system without upsetting plume stability. The unit cost per pound of contaminant removed is unchanging. This could be caused by O&M costs remaining relatively constant or a cumulative mass recovery rate that is relatively constant. In addition, the system is inexpensive relative to mass recovered.

Example 5

Ineffective Remediation System Benefit Trend;
Decreasing Relative Cost Trend; High Cost/Benefit
Indicator In this scenario, it may be possible to turn off the remediation system without upsetting plume stability. The unit cost per pound of contaminant removed is decreasing. This could be caused by decreasing O&M cost or a cumulative mass recovery rate that is increasing. In addition, the system is excessively expensive relative to mass recovered.

Example 6

Ineffective Remediation System Benefit Trend;
Decreasing Relative Cost Trend; Low Cost/Benefit
Indicator In this scenario, it may be possible to turn off the remediation system without upsetting plume stability. The unit cost per pound of contaminant removed is decreasing. This could be caused by decreasing O&M cost or a cumulative mass recovery rate that is increasing. In addition, the system is inexpensive relative to mass recovered.

Example 7

Effective Remediation System Benefit Trend;
Increasing Relative Cost Trend; High Cost/Benefit
Indicator This condition would indicate that the remedial system is providing benefit in keeping the plume Mass Indicator in check. This condition may indicate that turning off the remedial system could result in the plume moving from stable or decreasing to increasing because mass added by the contributing source exceeds mass removed via in-situ processes. The unit cost per pound of contaminant removed is increasing. This could be caused by increasing O&M cost or a cumulative mass recovery rate that is approaching asymptotic conditions. In addition, the system is excessively expensive relative to mass recovered.

Example 8

Effective Remediation System Benefit Trend;
Increasing Relative Cost Trend; Low Cost/Benefit
Indicator This condition would indicate that the remedial system is providing benefit in keeping the plume Mass Indicator in check. This condition may indicate that turning off the remedial system could result in the plume moving from stable or decreasing to increasing because mass added by the contributing source exceeds mass removed via in-situ processes. The unit cost per pound of contaminant removed is increasing. This could be caused by increasing O&M cost or a cumulative mass recovery rate that is approaching asymptotic conditions. In addition, the system is inexpensive relative to mass recovered.

Example 9

Effective Remediation System Benefit Trend;
Stagnant Relative Cost Trend; High Cost/Benefit
Indicator This condition would indicate that the remedial system is providing benefit in keeping the plume Mass Indicator in check. This condition may indicate that turning off the remedial system could result in the plume moving from stable or decreasing to increasing because mass added by the contributing source exceeds mass removed via in-situ processes. The unit cost per pound of contaminant removed is unchanging. This could be caused by O&M costs remaining relatively constant or a cumulative mass recovery rate that is relatively constant. In addition, the system is excessively expensive relative to mass recovered.

Example 10

Effective Remediation System Benefit Trend; Stagnant Relative Cost Trend; Low Cost/Benefit Indicator This condition would indicate that the remedial system is providing benefit in keeping the plume Mass Indicator in check. This condition may indicate that turning off the remedial system could result in the plume moving from stable or decreasing to increasing because mass added by the contributing source exceeds mass removed via in-situ processes. The unit cost per pound of contaminant removed is unchanging. This could be caused by O&M costs remaining relatively constant or a cumulative mass recovery rate that is relatively constant. In addition, the system is inexpensive relative to mass recovered.

Example 11

Effective Remediation System Benefit Trend; Decreasing Relative Cost Trend; High Cost/Benefit Indicator This condition would indicate that the remedial system is providing benefit in keeping the plume Mass Indicator in check. This condition may indicate that turning off the remedial system could result in the plume moving from stable or decreasing to increasing because mass added by the contributing source exceeds mass removed via in-situ processes. The unit cost per pound of contaminant removed is decreasing. This could be caused by decreasing O&M cost or a cumulative mass recovery rate that is increasing. In addition, the system is excessively expensive relative to mass recovered.

Example 12

Effective Remediation System Benefit Trend; Decreasing Relative Cost Trend; Low Cost/Benefit Indicator This condition would indicate that the remedial system is providing benefit in keeping the plume Mass Indicator in check. This condition may indicate that turning off the remedial system could result in the plume moving from stable or decreasing to increasing because mass added by the contributing source exceeds mass removed via in-situ processes. The unit cost per pound of contaminant removed is decreasing. This could be caused by decreasing O&M cost or a cumulative mass recovery rate that is increasing. In addition, the system is inexpensive relative to mass recovered.

Example 13

Beneficial Remediation System Benefit Trend; Increasing Relative Cost Trend; High Cost/Benefit Indicator This indicates that the remedial system is providing a benefit by removing mass at a rate faster than the source is contributing to the plume. In this scenario the remediation system could be construed as beneficial by reducing the expansion of the plume and possibly can help make the plume stable if the system is made more efficient or expanded. The unit cost per pound of contaminant removed is increasing. This could be caused by increasing O&M cost or a cumulative mass recovery rate that is approaching asymptotic conditions. In addition, the system is excessively expensive relative to mass recovered.

Example 14

Beneficial Remediation System Benefit Trend; Increasing Relative Cost Trend; Low Cost/Benefit Indicator This indicates that the remedial system is providing a benefit by removing mass at a rate faster than the source is contributing to the plume. In this scenario the remediation system could be construed as beneficial by reducing the expansion of the plume and possibly can help make the plume stable if the system is made more efficient or expanded. The unit cost per pound of contaminant removed is increasing. This could be caused by increasing O&M cost or a cumulative mass recovery rate that is approaching asymptotic conditions. In addition, the system is inexpensive relative to mass recovered.

Example 15

Beneficial Remediation System Benefit Trend; Stagnant Relative Cost Trend; High Cost/Benefit Indicator This indicates that the remedial system is providing a benefit by removing mass at a rate faster than the source is contributing to the plume. In this scenario the remediation system could be construed as beneficial by reducing the expansion of the plume and possibly can help make the plume stable if the system is made more efficient or expanded. The unit cost per pound of contaminant removed is unchanging. This could be caused by O&M costs remaining relatively constant or a cumulative mass recovery rate that is relatively constant. In addition, the system is excessively expensive relative to mass recovered.

Example 16

Beneficial Remediation System Benefit Trend; Stagnant Relative Cost Trend; Low Cost/Benefit Indicator This indicates that the remedial system is providing a benefit by removing mass at a rate faster than the source is contributing to the plume. In this scenario the remediation system could be construed as beneficial by reducing the expansion of the plume and possibly can help make the plume stable if the system is made more efficient or expanded. The unit cost per pound of contaminant removed is unchanging. This could be caused by O&M costs remaining relatively constant or a cumulative mass recovery rate that is relatively constant. In addition, the system is inexpensive relative to mass recovered.

Example 17

Beneficial Remediation System Benefit Trend; Decreasing Relative Cost Trend; High Cost/Benefit Indicator This indicates that the remedial system is providing a benefit by removing mass at a rate faster than the source is contributing to the plume. In this scenario the remediation system could be construed as beneficial by reducing the expansion of the plume and possibly can help make the plume stable if the system is made more efficient or expanded. The unit cost per pound of contaminant removed is decreasing. This could be caused by decreasing O&M cost or a cumulative mass recovery rate that is increasing. In addition, the system is excessively expensive relative to mass recovered.

Example 18

Beneficial Remediation System Benefit Trend; Decreasing Relative Cost Trend; Low Cost/Benefit Indicator This indicates that the remedial system is providing a benefit by removing mass at a rate faster than the source is contributing to the plume. In this scenario the remediation system could be construed as beneficial by reducing the expansion of the plume and possibly can help make the plume stable if the system is made more efficient or expanded. The unit cost per pound of contaminant removed is decreasing. This could be caused by decreasing O&M cost or a cumulative mass recovery rate that is increasing. In addition, the system is inexpensive relative to mass recovered.

Example 19

Overwhelmed Remediation System Benefit Trend; Increasing Relative Cost Trend; High Cost/Benefit Indicator This may indicate a poorly designed remediation system or an undersized or overwhelmed remediation system. In other words, the mass being added to the plume through a source exceeds the mass extracted via a treatment system. The remedial system in this situation may be providing some potential benefit by keeping the plume from expanding at a greater pace. The unit cost per pound of contaminant removed is increasing. This could be caused by increasing O&M cost or a cumulative mass recovery rate that is approaching asymptotic conditions. In addition, the system is excessively expensive relative to mass recovered.

Example 20

Overwhelmed Remediation System Benefit Trend; Increasing Relative Cost Trend; Low Cost/Benefit Indicator This may indicate a poorly designed remediation system or an undersized or overwhelmed remediation system. In other words, the mass being added to the plume through a source exceeds the mass extracted via a treatment system. The remedial system in this situation may be providing some potential benefit by keeping the plume from expanding at a greater pace. The unit cost per pound of contaminant removed is increasing. This could be caused by increasing O&M cost or a cumulative mass recovery rate that is approaching asymptotic conditions. In addition, the system is inexpensive relative to mass recovered.

Example 21

Overwhelmed Remediation System Benefit Trend; Stagnant Relative Cost Trend; High Cost/Benefit Indicator This may indicate a poorly designed remediation system or an undersized or overwhelmed remediation system. In other words, the mass being added to the plume through a source exceeds the mass extracted via a treatment system. The remedial system in this situation may be providing some potential benefit by keeping the plume from expanding at a greater pace. The unit cost per pound of contaminant removed is unchanging. This could be caused by O&M costs remaining relatively constant or a cumulative mass recovery rate that is relatively constant. In addition, the system is excessively expensive relative to mass recovered.

Example 22

Overwhelmed Remediation System Benefit Trend; Stagnant Relative Cost Trend; Low Cost/Benefit Indicator This may indicate a poorly designed remediation system or an undersized or overwhelmed remediation system. In other words, the mass being added to the plume through a source exceeds the mass extracted via a treatment system. The remedial system in this situation may be providing some potential benefit by keeping the plume from expanding at a greater pace. The unit cost per pound of contaminant removed is unchanging. This could be caused by O&M costs remaining relatively constant or a cumulative mass recovery rate that is relatively constant. In addition, the system is inexpensive relative to mass recovered.

Example 23

Overwhelmed Remediation System Benefit Trend; Decreasing Relative Cost Trend; High Cost/Benefit Indicator This may indicate a poorly designed remediation system or an undersized or overwhelmed remediation system. In other words, the mass being added to the plume through a source exceeds the mass extracted via a treatment system. The remedial system in this situation may be providing some potential benefit by keeping the plume from expanding at a greater pace. The unit cost per pound of contaminant removed is decreasing. This could be caused by decreasing O&M cost or a cumulative mass recovery rate that is increasing. In addition, the system is excessively expensive relative to mass recovered.

Example 24

Overwhelmed Remediation System Benefit Trend; Decreasing Relative Cost Trend; Low Cost/Benefit Indicator This may indicate a poorly designed remediation system or an undersized or overwhelmed remediation system. In other words, the mass being added to the plume through a source exceeds the mass extracted via a treatment system. The remedial system in this situation may be providing some potential benefit by keeping the plume from expanding at a greater pace. The unit cost per pound of contaminant removed is decreasing. This could be caused by decreasing O&M cost or a cumulative mass recovery rate that is increasing. In addition, the system is inexpensive relative to mass recovered.

Figure 11:
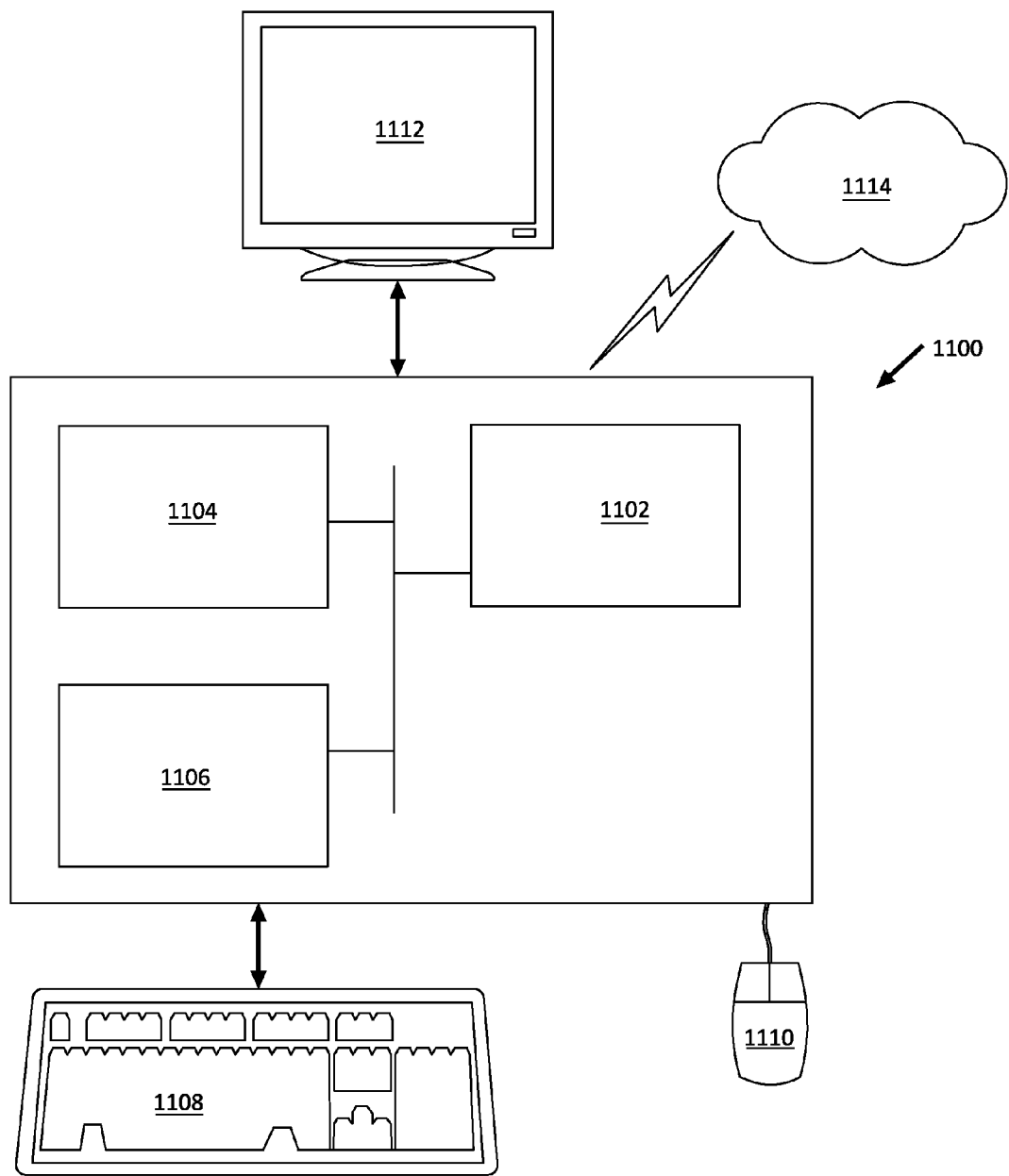
FIG. 11 is a schematic representation of a computer system that may be used according to embodiments of the present disclosure.

Embodiments of the present disclosure may be implemented on virtually any type of computer regardless of the platform being used. For example, as shown in FIG. 11, a computer system 1100 includes one or more processor(s) 1102, associated memory 1104 (e.g., random access memory (RAM), cache memory, flash memory, etc.), a storage device 1106 (e.g., a hard disk, an optical drive such as a compact disk drive or digital video disk (DVD) drive, a flash memory stick, etc.), and numerous other elements and functionalities typical of today's computers (not shown). The computer 1100 may also include input means, such as a keyboard 1108, a mouse 1110, or a microphone (not shown).

Further, the computer 1100 may include output means, such as a monitor 1112 (e.g., a liquid crystal display (LCD), a plasma display, or cathode ray tube (CRT) monitor). The computer system 1100 may be connected to a network 1114 (e.g., a local area network (LAN), a wide area network (WAN) such as the Internet, or any other similar type of network) via a network interface connection (not shown). Those skilled in the art will appreciate that many different types of computer systems exist, and the aforementioned input and output means may take other forms. Generally speaking, the computer system 1100 includes at least the minimal processing, input, and/or output means necessary to practice embodiments of the invention.

Further, those skilled in the art will appreciate that one or more elements of the aforementioned computer system 1100 may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on any non-transitory computer readable medium such as a compact disc (CD), a diskette, a tape, or any other non-transitory computer readable medium.

In certain embodiments of the present disclosure, the remediation system benefit analysis may be displayed on a graphical user interface. The graphical user interface may include dashboard functionality such that all outputs are displayed on one page, thereby allowing a user access to the cumulative results of the analysis.

Advantageously, embodiments of the present disclosure may allow more effective analysis techniques for evaluating the benefit of a remediation system. Because the analysis techniques allow for a condition of a remediation system to be defined, cost/benefit evaluations may be performed and/or remediation systems may be modified to more effectively remove contaminants from a plume.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

What is claimed:

1. A computer-implemented method for formatting a display unit to present plots of plume stability characteristics to direct subsequent remedial actions for a remediation system, the method comprising:
    calculating, by the processor, plume stability characteristics for a given plume;
    determining, by the processor, a mass indicator regression trend line using the plume stability characteristics;
    determining, by the processor, a contaminant removed regression trend line of contaminant removal from the plume by the remediation system; and
    automatically graphically displaying, at the display unit, at a plot having a first axis associated with a weight unit and a second axis associated with time, the mass indicator regression trend line and the contaminant removed trend line superimposed in relation to the mass indicator regression trend line such that the contaminant removed regression trend line and the mass indicator regression trend line are normalized to the same weight unit and originating at a common point on the first plot, wherein the mass indicator regression trend line is presented with a first line type and the contaminant removed regression trend line is presented with a second line type, wherein the first line type is different from the second line type; and
    presenting, at the display unit, a list of remedial actions, including:
        i) indicia for a first action when an unsigned numerical value of a first slope associated with the mass indicator regression trend line is greater than an unsigned numerical value of a second slope associated with the contaminant removed regression trend line and each of the first and second slopes is of different signs to each other,
        ii) indicia for a second action when the unsigned numerical value of the first slope is less than the unsigned numerical value of the second slope and each of the first and second slopes is of different signs to each other,
        iii) indicia for a third action when the unsigned numerical value of the first slope is less than the unsigned numerical value of the second slope and both of the first and second slopes are of the same sign, and
        iv) indicia for a fourth action when the unsigned numerical value of the first slope is greater than the unsigned numerical value of the second slope and both of the first and second slopes are of the same sign.

2. The method of claim 1, wherein the calculating plume stability characteristics comprises determining at least one selected from a group consisting of an area, an average concentration, a mass, and a center of mass.

3. The method of claim 1, wherein the first action is listed as a remedial action for an effective system, the second action is listed as a remedial action for an ineffective system, the third action is listed as a remedial action for an overwhelmed system, and the fourth action is listed as a remedial action for a beneficial system.

4. The method of claim 1, further comprising:
    presenting, at the display unit, next to indicia to the first action, instructions to increase processing by the remediation system.

5. The method of claim 1, further comprising:
    presenting, at the display unit, next to the indicia of the second action, instructions to remove the remediation system.

6. The method of claim 1, further comprising:
    presenting, at the display unit, next to the indicia of the third action, instructions to modify the remediation system to increase processing of the indicator contaminant at the plume.

7. A method for analyzing a remediation system, the method comprising:
    determining, via a computer, a first set of graphical outputs of a remediation system benefit trend for the remediation system;

determining, via the computer, a second set of graphical outputs of a relative cost trend for the remediation system;

determining, via the computer, a third set of graphical outputs of a cost/benefit indicator for the remediation system; and generating, via the computer, a report of the remediation system according to the remediation system benefit trend, the relative cost trend, and the cost/benefit indicator, wherein the report comprises the first set of graphical outputs of the remediation system benefit trend, the second set of graphical outputs of the relative cost trend, and the third set of graphical outputs of the cost/benefit indicator combined in a single graphical representation, wherein the first set of graphical outputs, the second set of graphical outputs, and the third set of graphical outputs are disposed at pre-defined regions of the single graphical representation, the single graphical representation of the remediation system being a characterization of the remediation system for subsequent comparison with other remediation systems.

8. The method of claim 7, wherein the remediation system benefit trend is one of ineffective, effective, overwhelmed, and beneficial.

9. The method of claim 7, wherein the relative cost trend is one of increasing, decreasing, and stagnant.

10. The method of claim 7, wherein the cost/benefit indicator is one of a high and low.

11. The method or claim 10, wherein the cost/benefit indicator comprises a value between 0 and 90.

12. The method of claim 7, comprising modifying the remediation system based on the categorizing of the remediation system.

13. The method of claim 7, comprising graphically outputting the remediation system benefit trend, the relative cost trend, and the cost/benefit indicator onto a graphical display of a computer.

* * * * *